(12) United States Patent
Rodenbeck et al.

(10) Patent No.: US 10,989,807 B2
(45) Date of Patent: Apr. 27, 2021

(54) AUTONOMOUS AIRBORNE VEHICLE CONTROLLED BY MILLIMETER WAVE RADAR

(71) Applicant: The Government of the United States of America, as represented by the Secretary of the Navy, Arlington, VA (US)

(72) Inventors: Christopher T. Rodenbeck, Annandale, VA (US); Thomas Pizzillo, Dunkirk, MD (US); Thomas Apker, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 355 days.

(21) Appl. No.: 15/845,095

(22) Filed: Dec. 18, 2017

(65) Prior Publication Data

US 2018/0174472 A1 Jun. 21, 2018

Related U.S. Application Data

(60) Provisional application No. 62/435,203, filed on Dec. 16, 2016.

(51) Int. Cl.
*G01S 13/89* (2006.01)
*G01S 13/86* (2006.01)
(Continued)

(52) U.S. Cl.
CPC ............ *G01S 13/89* (2013.01); *B64C 39/024* (2013.01); *G01C 21/005* (2013.01); *G01S 5/04* (2013.01);
(Continued)

(58) Field of Classification Search
CPC .. G01S 13/933; G08G 5/0021; G08G 5/0078; G08G 5/0069; G05D 1/104;
(Continued)

(56) References Cited

U.S. PATENT DOCUMENTS 5,202,692 A    4/1993  Huguenin et al.
5,461,384 A    10/1995 Sieprath et al.
(Continued)

FOREIGN PATENT DOCUMENTS

CN          106019285 A  *  10/2016

OTHER PUBLICATIONS

Bernier et al.; DSA Radar—Development Report; AUVSI 2005—Baltimore, USA; Jun. 28-Jun. 30, 2005; pp. 1-13 (Year: 2005).*
(Continued)

*Primary Examiner* — Michael J Zanelli
(74) *Attorney, Agent, or Firm* — US Naval Research Laboratory; William Ladd

(57) ABSTRACT

Systems and methods are provided for autonomous airborne vehicle control using a millimeter-wave (MMW) radar. Embodiments of the present disclosure enable a MMW radar system to support an unmanned aerial vehicle (UAV) in accomplishing missions involving interacting with peers. In an embodiment, a MMW radar module of a UAV in accordance with an embodiment of the present disclosure enables the UAV to take a measurement (e.g., regarding the location of another UAV) using the MMW radar, classify a return (e.g., a MMW radar return), determine whether the detected object is a peer, and update the vehicle velocity accordingly.

20 Claims, 12 Drawing Sheets

(51) Int. Cl.

| | |
|---|---|
| *G08G 5/02* | (2006.01) |
| *G01C 21/00* | (2006.01) |
| *G08G 5/00* | (2006.01) |
| *G08G 5/04* | (2006.01) |
| *G05D 1/10* | (2006.01) |
| *G01S 13/933* | (2020.01) |
| *G01S 13/935* | (2020.01) |
| *B64C 39/02* | (2006.01) |
| *G01S 5/04* | (2006.01) |
| *G05D 1/00* | (2006.01) |
| *G05D 1/12* | (2006.01) |
| *G01S 13/90* | (2006.01) |

(52) U.S. Cl.
CPC ............ *G01S 13/86* (2013.01); *G01S 13/933* (2020.01); *G01S 13/935* (2020.01); *G05D 1/0088* (2013.01); *G05D 1/104* (2013.01); *G05D 1/106* (2019.05); *G05D 1/12* (2013.01); *G08G 5/0008* (2013.01); *G08G 5/0021* (2013.01); *G08G 5/0052* (2013.01); *G08G 5/0069* (2013.01); *G08G 5/0078* (2013.01); *G08G 5/0086* (2013.01); *G08G 5/025* (2013.01); *G08G 5/045* (2013.01); *B64C 2201/141* (2013.01); *B64C 2201/143* (2013.01); *G01S 13/9064* (2019.05)

(58) Field of Classification Search
CPC ................. G05D 1/0088; G05D 1/101; B64C 2201/141; B64C 2201/143
See application file for complete search history.

(56) References Cited

U.S. PATENT DOCUMENTS

| | | | |
|---|---|---|---|
| 6,211,809 B1 | 4/2001 | Stiles | |
| 6,445,344 B1 | 9/2002 | Wise et al. | |
| 7,015,855 B1* | 3/2006 | Medl | G01S 7/412 342/25 A |
| 2005/0055143 A1 | 3/2005 | Doane | |
| 2016/0069994 A1* | 3/2016 | Allen | G01S 13/584 342/29 |
| 2018/0011180 A1* | 1/2018 | Warnick | G01S 7/352 |

OTHER PUBLICATIONS

International Search Report for PCT/US17/66809 from the International Searching Authority, dated Apr. 20, 2018.
Written Opinion for PCT/US17/66809 from the International Searching Authority, dated Apr. 20, 2018.
International Preliminary Report on Patentability for PCT/US17/66809 from the International Searching Authority, dated Jun. 18, 2019.

* cited by examiner

Vertical (left) and horizontal (right) reachable space and covering radar fan for UAV-A.

Vertical (left) and horizontal (right) reachable space and covering radar fan for UAV-B.

| Delphi SRR2 Blind Spot Automotive Radar Characteristics | |
|---|---|
| Vertical resolution | 10° |
| Horizontal field of view | 150° |
| Vertical field of view | 10° |
| Range resolution | 0.3 m |
| Tracked targets (beams) | 64 |
| DC power | 7 W |
| Vertical resolution | 10° |
| Horizontal field of view | 150° |

FIG. 9

AUTONOMOUS AIRBORNE VEHICLE CONTROLLED BY MILLIMETER WAVE RADAR

CROSS REFERENCE TO RELATED APPLICATIONS

This application claims the benefit of U.S. Provisional Patent Application No. 62/435,203, filed on Dec. 16, 2016, which is incorporated by reference herein in its entirety.

FIELD OF THE DISCLOSURE

This disclosure relates to unmanned aerial vehicles (UAVs), including navigation for unmanned aerial vehicles.

BACKGROUND

Current small-size, low-cost unmanned air vehicles (UAVs) rely primarily on ground-based control and guidance. Onboard sensors are limited, leaving important capability gaps in military-relevant functions, such as terminal guidance, sense-and-avoid, swarming, and formation control. Operations at night or in degraded visual environments are heavily constrained. There is a need for sensor technology for small UAVs that overcomes the challenges of conventional UAV sensors.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings:

FIG. 9 shows a table of characteristics of the Delphi SRR2 short-range radar in accordance with an embodiment of the present disclosure.

Figure 1:
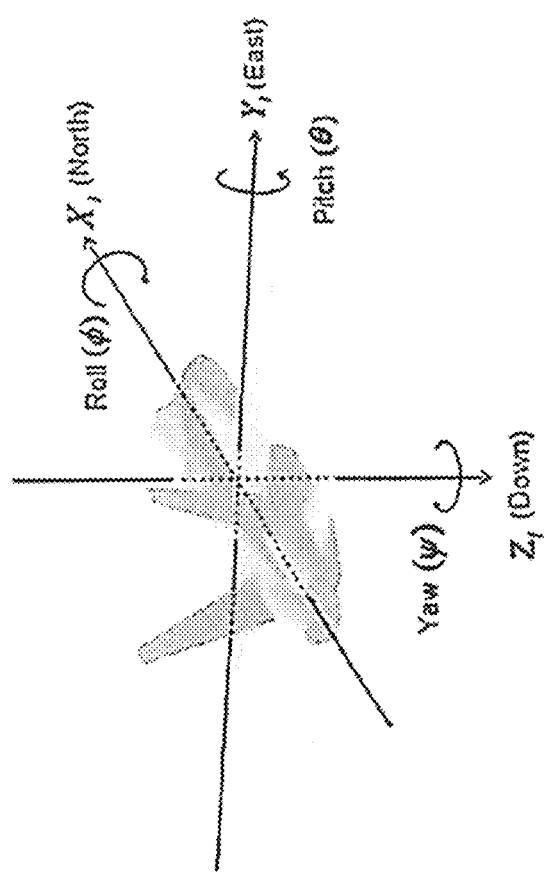
FIG. 1 is a diagram of an exemplary coordinate system used by an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

Embodiments of the present disclosure provide systems and methods for autonomous UAV control using millimeter-wave (MMW) radar that overcomes the technology gaps of conventional UAV sensors. For example, embodiments of the present disclosure use MMW radar for terrain-aided navigation in support of autonomous guidance, landing, and mapping functions in all weather for small UAVs. Embodiments of the present disclosure enable autonomous operation at low altitudes in cluttered environments and provide a means of correlating MMW radar returns with high resolution terrain maps to enable navigation in GPS-denied environments.

Experimental results demonstrate that MMW radar technology significantly enhances small UAV operations. Future missions for UAVs will involve operating near buildings, ships and trees in all light and weather where global navigation satellite signals are unavailable. Swarms or teams of UAVs will be able to replace larger sensor and delivery systems for a variety of applications.

In an embodiment, MMW radar returns can be used to determine the height of obstacles in the field of view of a UAV. The UAV can produce a three dimensional (3D) image of nearby terrain that can be used for trajectory planning and local navigation and compared to Digital Terrain Elevation Data (DTED) for global navigation.

A UAV using MMW radar in accordance with an embodiment of the present disclosure can resolve obstacles with enough resolution to permit flight along the nap-of-the-earth at low altitude in addition to providing DTED-aided navigation. MMW radar is able to operate in all weather, including smoke, without significant performance loss and at lower net power (e.g., transceiver plus processor) than light-based navigation. Embodiments of the present disclosure can tolerate a high false-negative rate as is common with radars facing small objects, such as tree tops, in clutter. This approach can scale to a very large map by using an octree representation instead of a fixed grid.

Embodiments of the present disclosure include MMW radar technology that significantly enhances UAV operations including terminal guidance, sense-and-avoid, swarming, and formation control. Embodiments of the present disclosure include a determination of the detection geometry required to enable a MMW radar system to support a UAV in accomplishing missions. Embodiments of the present disclosure enable autonomous operation at low altitudes in cluttered environments and provide a means of correlating millimeter-wave (MMW) radar returns with high resolution terrain maps to enable navigation in GPS-denied environments. This process significantly reduces cost, development time, and complexity when compared to conventional approaches and improves range and velocity resolution.

2. MMW RADAR

Many tracking and control problems involve operations on vectors between aircraft. Conventional UAV control solutions use broadcast telemetry data or vision-based (EO/IR) sensors. Radars directly measure the distance and angles between aircrafts, which allows much simpler control algorithms.

MMW Radar is advantageous for use in UAVs for several reasons. For example, advances in microelectronics technologies such as silicon (Si) complementary metal oxide semiconductor (CMOS) and silicon-germanium (SiGe) bipolar CMOS (BiCMOS) make it possible to produce low-power radar transceivers for essentially equivalent cost whether at MMW (>30 GHz) or microwave (<30 GHz).

MMW radar antennas are smaller than lower frequency radar antennas of equivalent angular resolution. This makes MMW radar well suited for small-size UAVs. For example, to achieve a specified angular resolution, the maximum linear dimension of a MMW radar antenna operating at 60 GHz is ⅙ that of a microwave radar antenna operating at 10 GHz.

Much wider signal bandwidths are available in the MMW range (>30 GHz) than in the microwave range (<30 GHz). Increased bandwidth provides improved radar range resolution (i.e., resolution in distance measurement). This improved radar range resolution greatly enhances the radar's ability to separate objects in the radial dimension.

A radar's velocity resolution is directly proportional to the frequency of operation, again providing advantage to MMW. This improvement in velocity resolution allows the radar to discriminate easily between objects moving at different speeds.

Spatial resolution is another important system consideration in favor of MMW radar. Inverse synthetic aperture radar (ISAR) resolution and angular resolution both improve linearly with frequency. ISAR resolution can be defined as the cross-range imaging resolution against a moving object that undergoes at least a 1° aspect angle change with respect to the radar platform. Angular resolution can refer to the spotlight size of the radar beam.

Another important factor in MMW radar is atmospheric attenuation. MMW sensing has high resilience for operating in optically degraded visual environments. A spike in atmospheric absorption at 60 GHz presents interesting opportunities for military applications. One-way atmospheric absorption at 60 GHz is tremendous for distances exceeding 10 km. Yet within distances of 200 m, the atmospheric loss at 60 GHz is within a manageable range.

3. CONTROLLING A UAV USING MMW RADAR

Embodiments of the present disclosure include a determination of the detection geometry required to enable a MMW radar system to support a UAV in accomplishing missions (e.g., involving interacting with peers): for example, (1) the geometry requirements of the radar system based on what position the vehicle can reach by reorienting its lift vector (or thrust vector, for rotorcraft) and (2) the radar detection requirement needed to inform the UAV autopilot to begin a maneuver. FIG. 1 is a diagram of an exemplary coordinate system used by an embodiment of the present disclosure (e.g., assuming that the radar is mounted looking forward along the body frame's x-axis). In an embodiment, azimuth angle refers to an angular displacement relative to the x-axis in the body xy plane. In an embodiment, elevation angles are measured relative to the x-axis in the xz plane and treat positive as "up" to maintain consistency with ground-based systems.

Figure 2:
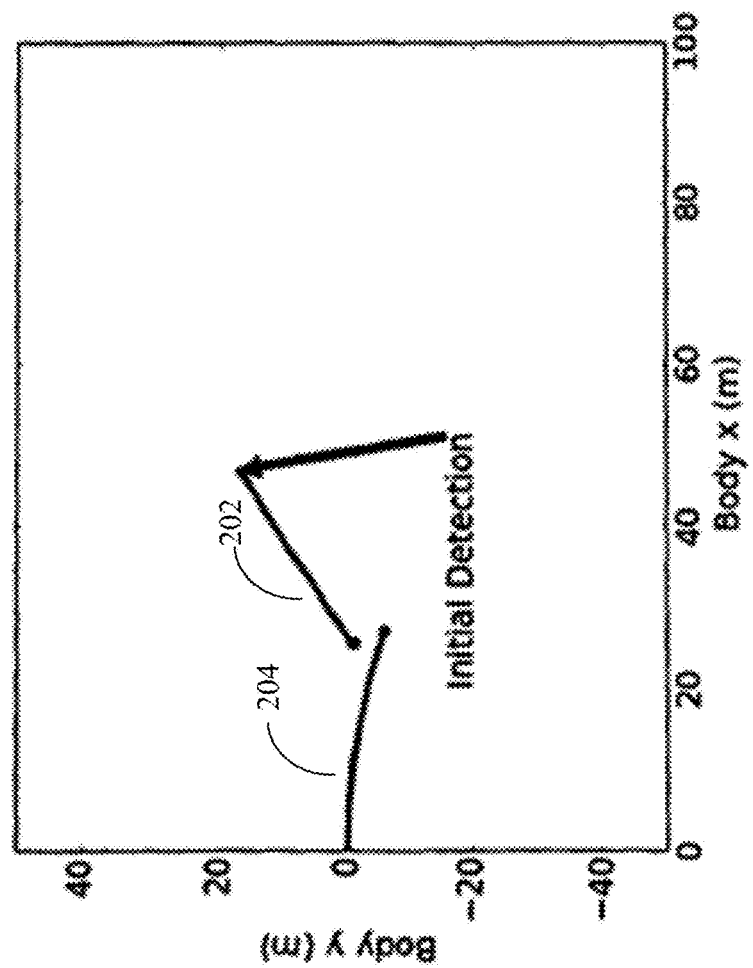
FIG. 2 is a diagram illustrating UAV collision avoidance in accordance with an embodiment of the present disclosure.

FIG. 2 is a diagram illustrating UAV collision avoidance in accordance with an embodiment of the present disclosure. Assuming constant-altitude and constant-speed flight, a fixed-wing aircraft needs a certain distance to execute an escape trajectory if another vehicle crosses its path. For this analysis, the most relevant case is a non-cooperative peer (e.g., intruder) vehicle detected on a straight-line collision course 202. This situation can arise if the intruder vehicle is assigned a higher-priority task and assumes its fellow swarm member will simply get out of the way, or if it suffers a system failure and is attempting to return to its rally point. To avoid collision, a UAV can change its trajectory to an escape trajectory 204. This simple simulation assumes a UAV with cruise speed of 28 m/s and bank angle of 30°.

The collision evaded in FIG. 2 is characterized by a constant bearing and decreasing range (CBDR). To determine the minimum required detection range d at a particular angle $\vartheta$, we initialize a simple simulator with the evader platform at (0,0) and the intruder at (d cos($\vartheta$), d sin($\vartheta$)) with a heading of $\pi+2\vartheta$. The evader's heading constantly changes by an angular velocity of $r=g \sin(\theta/u)$, where g is the maximum downward acceleration, $\theta$ is the maximum bank angle, and u is the flight speed. This causes the escaper to turn away from the detected intruder as fast as a linear controller allows at constant altitude. The simulation runs until either the distance between vehicles begins increasing or that distance falls below a minimum distance threshold of 5 m. If this distance is below the minimum threshold, the initial detection range increases by 1 m and the simulation repeats.

Figure 3:
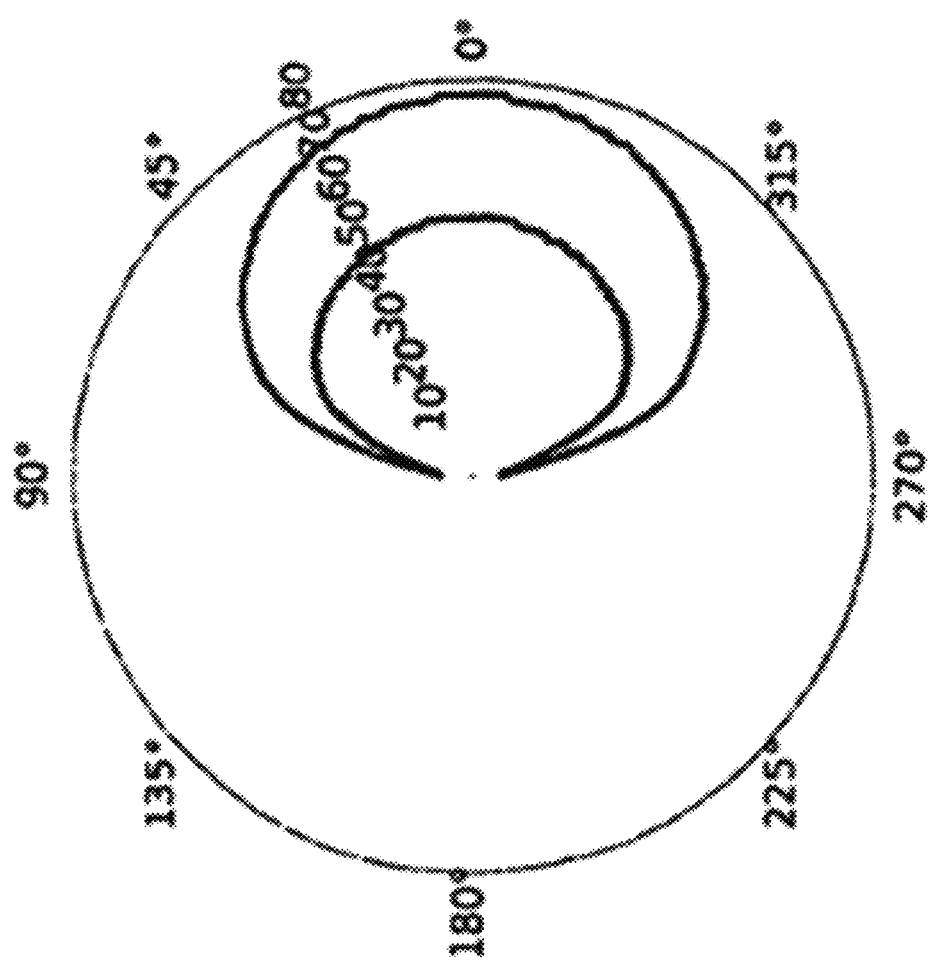
FIG. 3 is a diagram illustrating the minimum detection range versus angle for two small, fixed-wing UAVs in accordance with an embodiment of the present disclosure.

FIG. 3 is a diagram illustrating the minimum detection range versus angle for two small, fixed-wing UAVs in accordance with an embodiment of the present disclosure. In FIG. 2, the two UAVs have cruise speeds of 26.7 and 18 m/s (described as UAV-A and UAV-B respectively). The curves are generated by running the CBDR evasion simulator for each angle between 0° and 180° and decreasing the range of initial detection until the minimum approach distance just exceeds 5 m. In both cases, the worst-case condition is for an intruder directly in the line of flight. For the slower UAV-B, an 80 m detection range is required. Via basic radar analysis, this distance is within the maximum range of a 5-inch-diameter MMW radar using currently available electronics components technology, even for a very small intruder radar cross-section (RCS) of just 0.01 m².

The above discussion describes the requirements for a UAV-based MMW radar to "generate a miss" from a non-cooperative intruder crossing its path. Next, we discuss the radar requirements to "generate a hit." To bound the complexity of the problem, it is assumed that "terminal" in this terminal guidance context covers 2 s of flight. In addition, although the detection is assumed to be stationary, the following analysis applies for moving detected objects by simply considering the platform velocity to be the relative velocity between the platform and the detected object. The UAV's reachable space is computed based on the same maximum lateral acceleration bounds described for the sense-and-avoid application, a maximum climb rate (2.8 m/s for UAV-A and 2.3 m/s for UAV-B), and a downward vertical acceleration limit of −1 g.

Figure 4A:
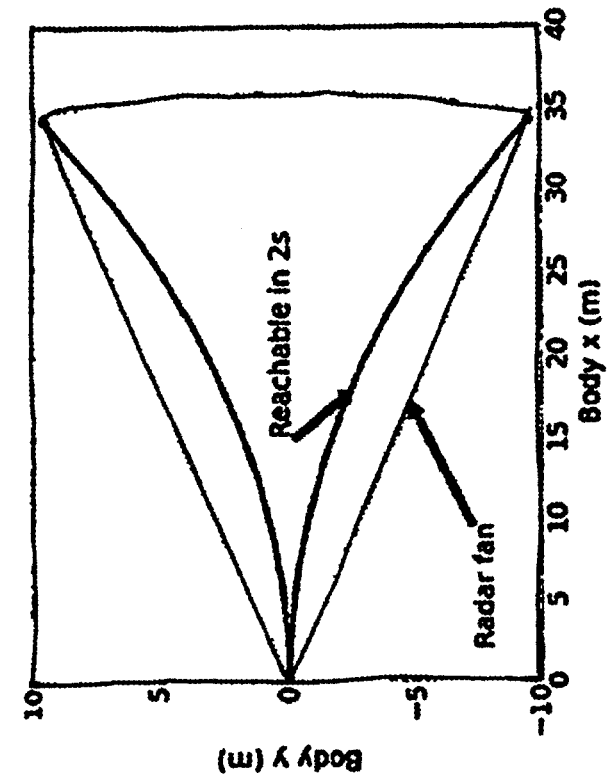
FIGS. 4A and 4B are diagrams showing exemplary horizontal and vertical reachable space for UAVs in accordance with an embodiment of the present disclosure.
Figure 4A:
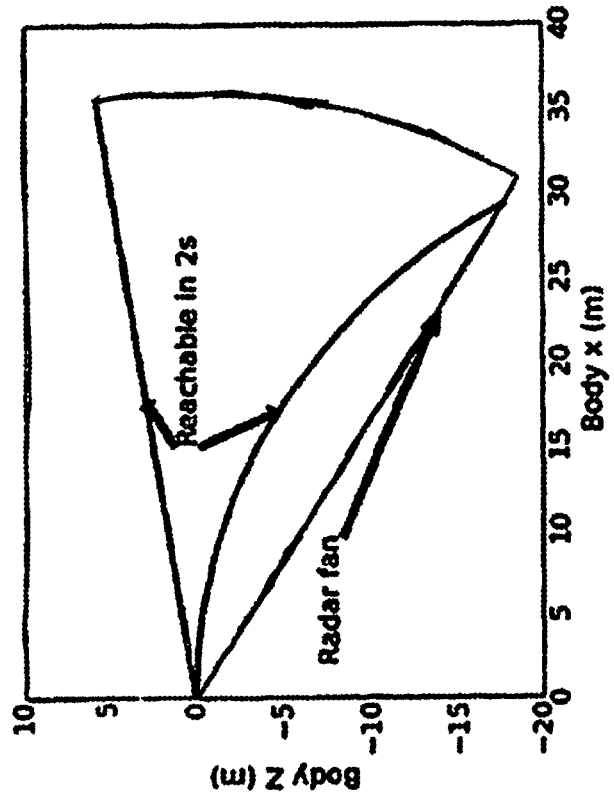
Figure 4B:
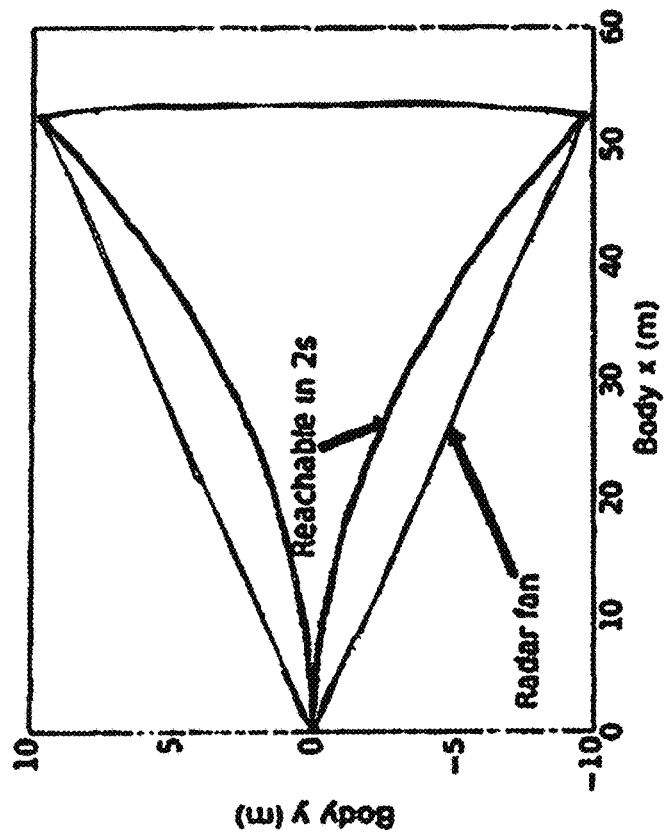
Figure 4B:
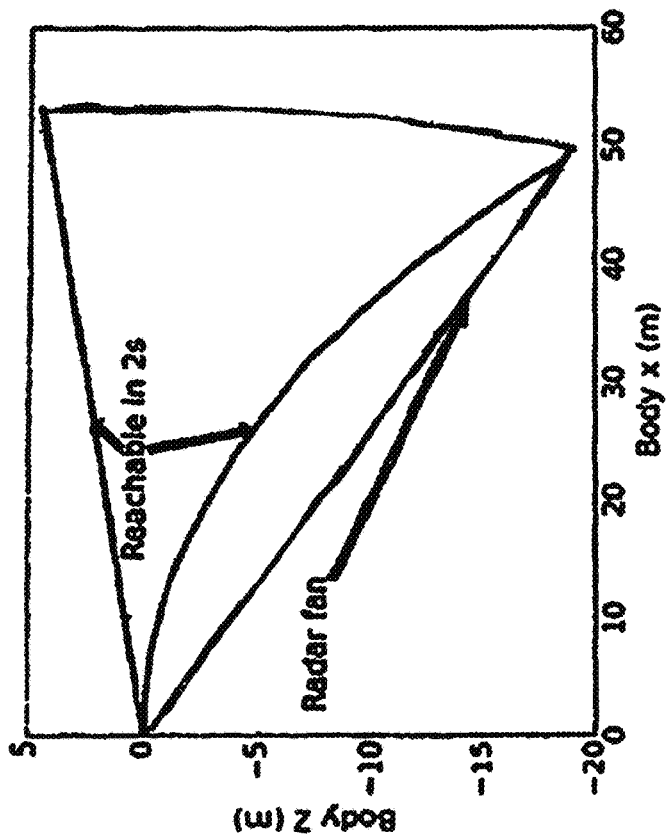

FIGS. 4A and 4B are diagrams showing exemplary horizontal and vertical reachable space for UAVs in accordance with an embodiment of the present disclosure. Specifically, FIGS. 4A and 4B show the horizontal and vertical reachable space for the UAV-A and UAV-B platforms, comparing this space with a radar field of view designed to detect objects within that reachable space. Specifically, the radar range required to reach a detected object of interest is 2 s times the platform's flight speed. For detected object RCS greater than or equal to the UAV's peers, this range requirement is well within the scope of a system designed for sense-and-avoid applications.

Figure 5:
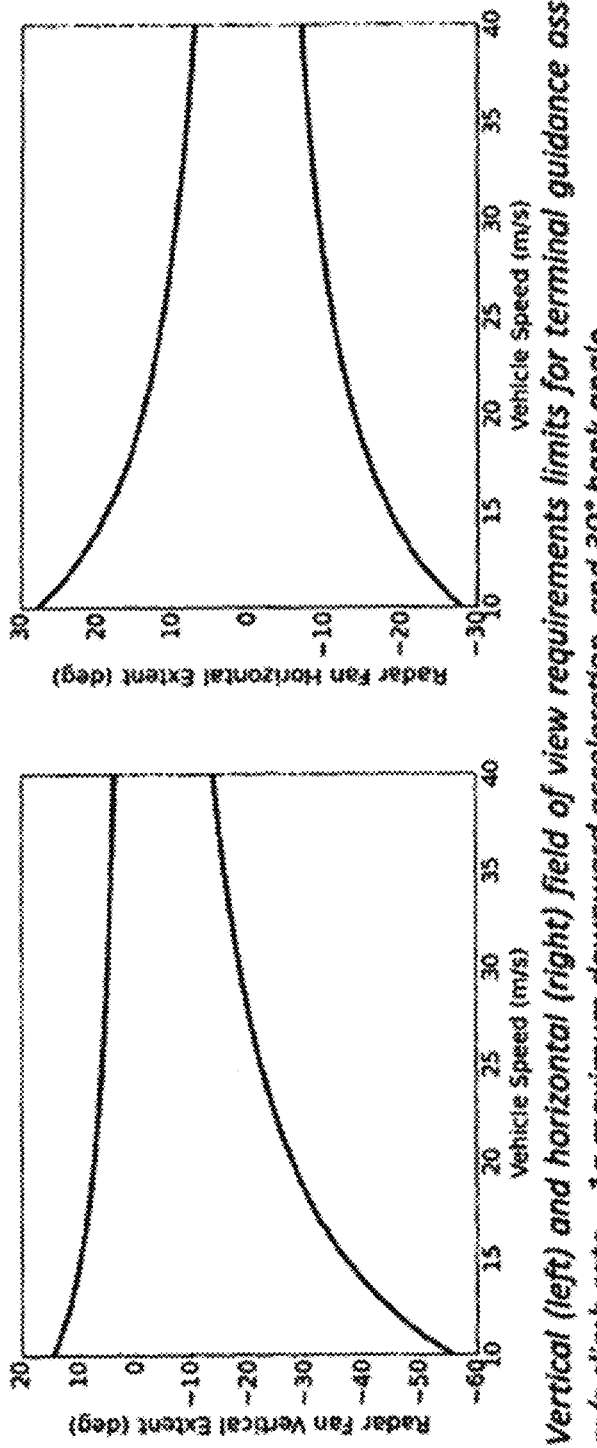
FIG. 5 is a diagram illustrating the up/down and left/right field of view required to guarantee full coverage of a UAV's reachable space in accordance with an embodiment of the present disclosure.

FIG. 5 is a diagram illustrating the up/down and left/right field of view required to guarantee full coverage of a UAV's reachable space in accordance with an embodiment of the present disclosure. These requirements are presented as a function of UAV speed. The flight dynamics model applies to both fixed- and rotary-wing platforms engaged in forward flight. The plots show that a slower platform, such as a multirotor aircraft, requires a much wider radar field of view than a high-speed, fixed-wing platform. However, multirotor aerodynamics allow for larger cross section payloads, such as gimbals, and so it may be possible to design a sensor for the most stressing fixed-wing case and then increase its coverage by mechanically slewing it on slower platforms.

4. AUTONOMOUS TRACKING AND UAV CONTROL

Figure 6A:
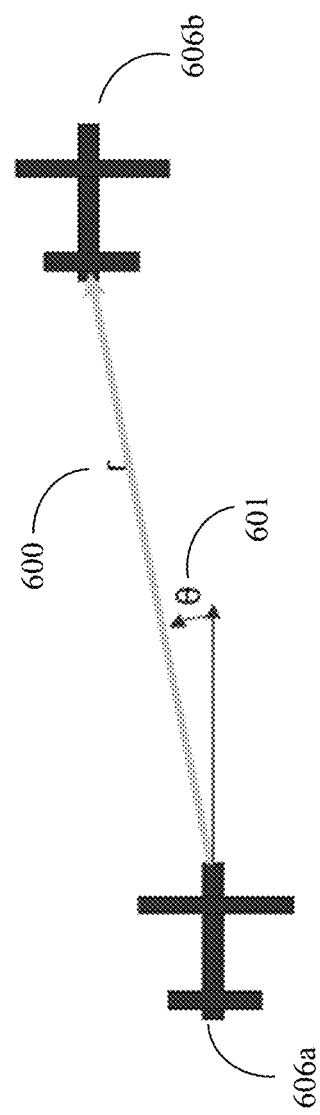
FIG. 6A is a diagram illustrating distance and angles between two UAVs in accordance with an embodiment of the present disclosure.

FIG. 6A is a diagram illustrating distance and angles between two UAVs in accordance with an embodiment of the present disclosure. Specifically, FIG. 6A shows the distance r 600 and angle θ 601 between a controlled UAV 606a and a detected UAV 606b (e.g., another UAV that the controlled UAV can fly in formation with). A UAV with a MMW radar in accordance with an embodiment of the present disclosure can directly measure r 600 and θ 601, allowing for a much simpler control algorithm (with just the need of an acceptable classifier).

Figure 6B:
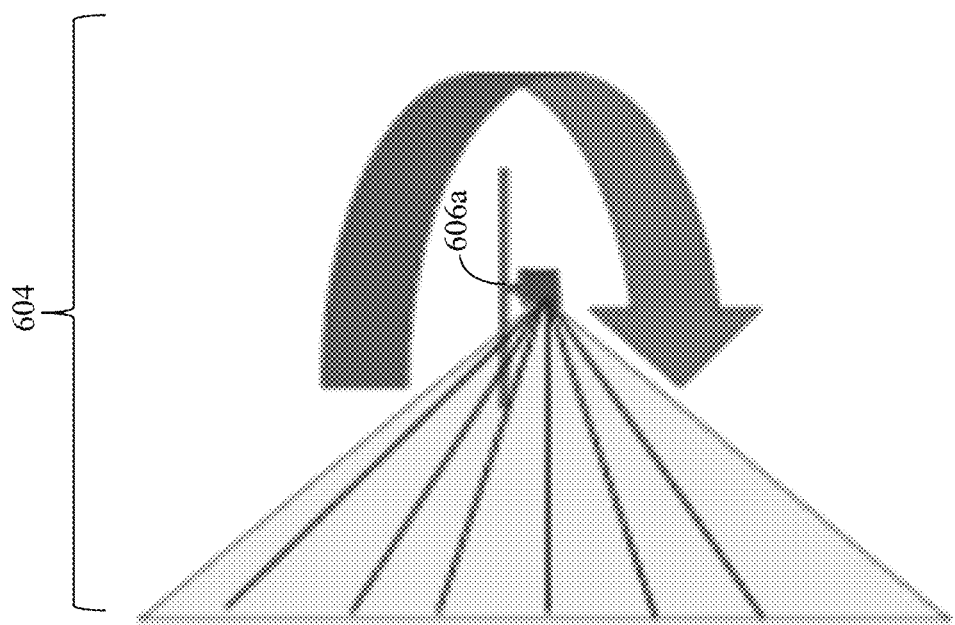
FIG. 6B shows two diagrams illustrating a top view and side view, respectively, of autonomous tracking and control by a UAV with a vertical fan beam in accordance with an embodiment of the present disclosure.
Figure 6B:
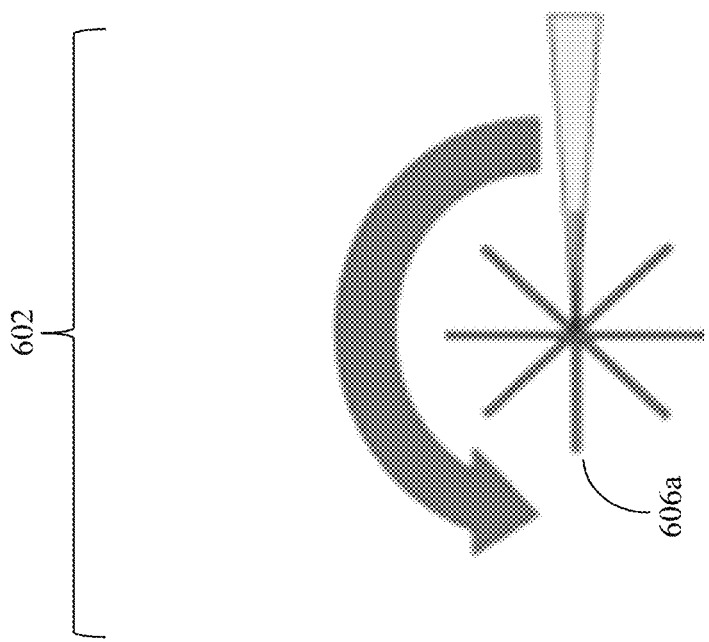

FIG. 6B shows two diagrams illustrating a top view 602 and side view 604, respectively, of a UAV 606a with a vertical fan beam in accordance with an embodiment of the present disclosure. In an embodiment, the fan beam in FIG. 6B is a 150° horizontal beam (mounted as a vertical beam) generated by a MMW radar with sensor output routed through a control board of UAV 606a. In FIG. 6B, UAV 606a hovers at an elevation (e.g., a predetermined elevation, such as 100 m above ground or an elevation determined by the height of objects on the ground) and rotates in place until a detected object (e.g., a peer UAV, such as UAV 606b, that UAV 606a will fly in formation with) is found. In an embodiment, once a detection is made, UAV 606a is configured to maintain a fixed (e.g., predetermined and user configurable) distance between UAV 606a and UAV 606b, adjusting relative position, velocity, bearing, etc. of UAV 606a if necessary to maintain the fixed distance between UAV 606a and UAV 606b.

In an embodiment, UAV 606a continually tracks UAV 606b (e.g. using the MMW radar) while maintaining the distance between UAV 606a and UAV 606b. In an embodiment, on detection, UAV 606a can start a timer (e.g., a timer to determine when to rescan for detections using the MMW radar). In an embodiment, if the timer expires, UAV 606a can rescan for detections, and if necessary, reverse rotation direction to reacquire the detection.

Figure 6C:
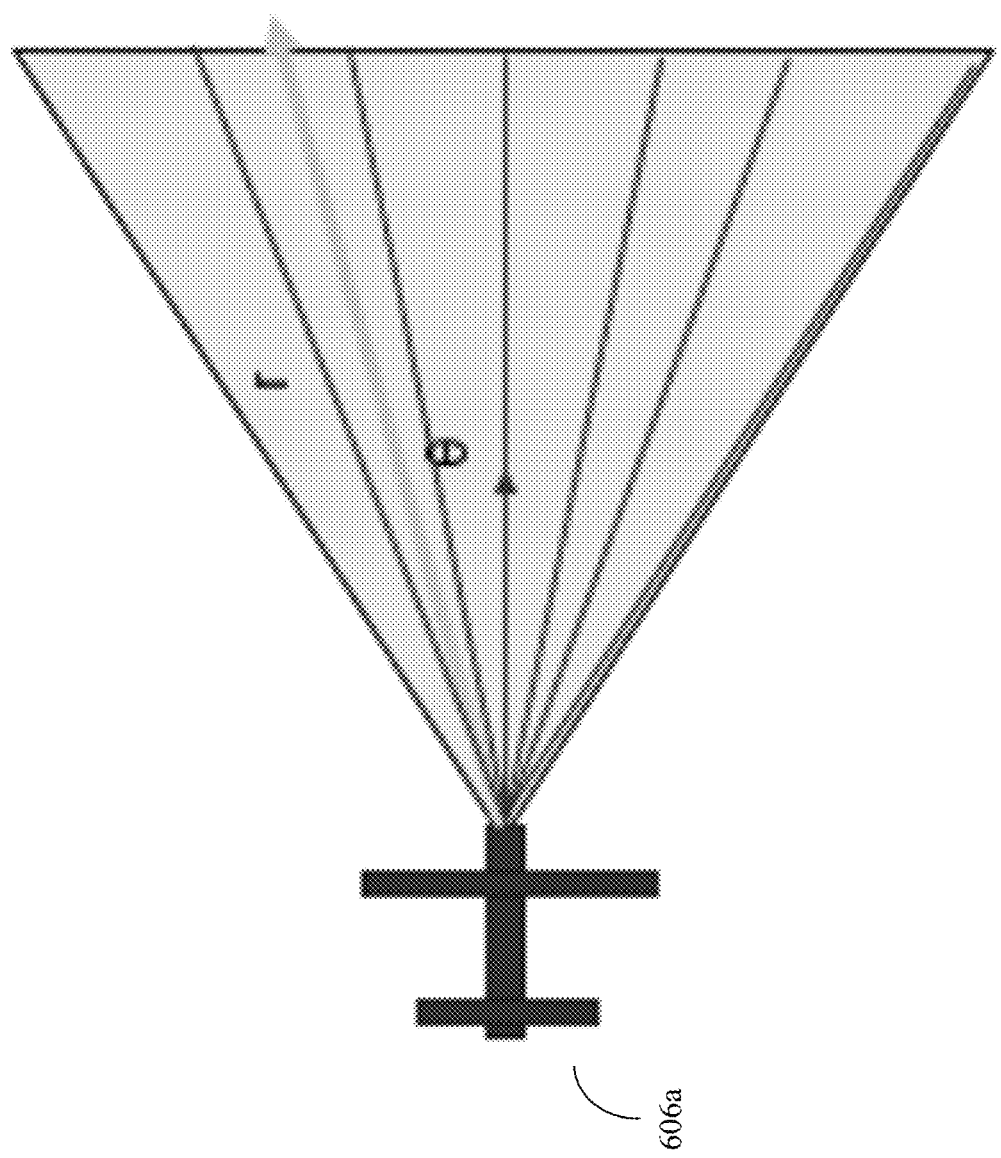
FIG. 6C shows a diagram illustrating autonomous tracking and control by a UAV with a horizontal fan beam in accordance with an embodiment of the present disclosure.

FIG. 6C shows a diagram illustrating autonomous tracking and control by a UAV with a horizontal fan beam in accordance with an embodiment of the present disclosure. In FIG. 6B, UAV 606a maneuvers to a location with a high probability of detection, and, on detection, rotates the platform to reduce θ 601. In an embodiment, if θ 601 is less than 10°, UAV 606a moves forward to reducer 600.

Figure 7:
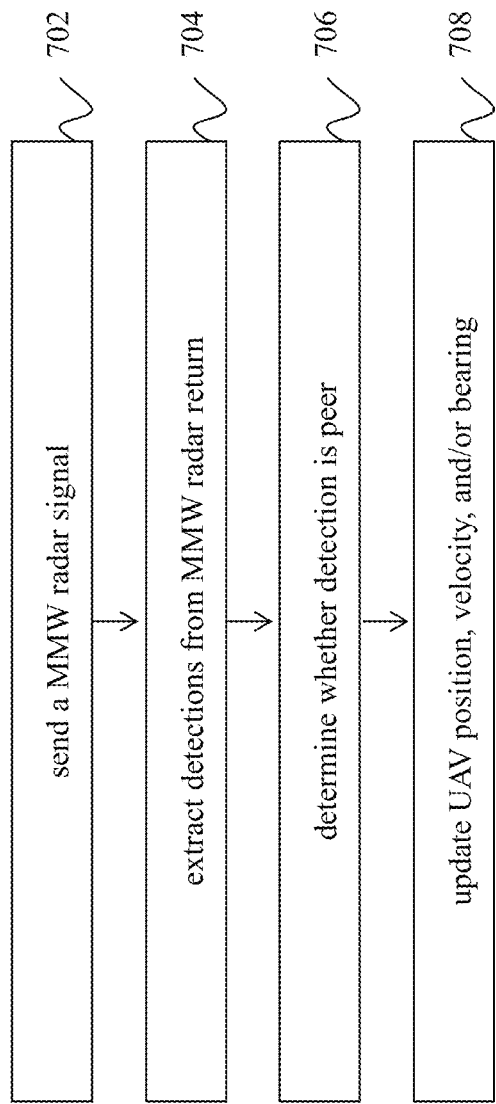
FIG. 7 is a flowchart of a method for autonomous tracking and control using a UAV with a MMW radar in accordance with an embodiment of the present disclosure.

FIG. 7 is a flowchart of a method for autonomous tracking and control using a UAV with a MMW radar in accordance with an embodiment of the present disclosure. In step 702, a MMW radar signal is sent to detect an object. For example, a controlled UAV 606a can send a MMW radar signal to locate a UAV 606b (e.g., a peer UAV that UAV 606a will fly in formation with). In step 704, a MMW radar return is processed for detection. For example, UAV 606a can receive MMW radar returns from UAV 606b, determine whether the MMW radar returns represent the presence of an object in the air (e.g., a UAV that UAV 606a is configured to follow, such as UAV 606b or another object in the air). In step 706, a determination is made whether the detected object is a peer. For example, UAV 606a can determine whether UAV 606b is a peer (or, e.g., a third party UAV, a bird, a wire, a building, etc.).

In an embodiment, UAV 606a can measure the distance r 600 and angle θ 601 between UAV 606a and a detected UAV 606b. In an embodiment, UAV 606a can be configured to take different actions depending on whether UAV 606b is determined to be a peer. For example, in an embodiment, if the detection is a peer, autonomous controller 806 can instruct flight controller 814 to fly in formation with it (e.g., by maintaining a constant r 600 and θ 601 between UAV 606a and UAV 606b). In an embodiment, if the detection is not a peer, autonomous controller 806 can instruct flight controller 814 to avoid the detected object. In step 708, the UAV position, velocity, and/or bearing is updated (e.g., if UAV 606a determines to follow UAV 606b). For example, UAV 606a can be configured to follow UAV 606b and/or avoid a collision with UAV 606b.

Figure 8:
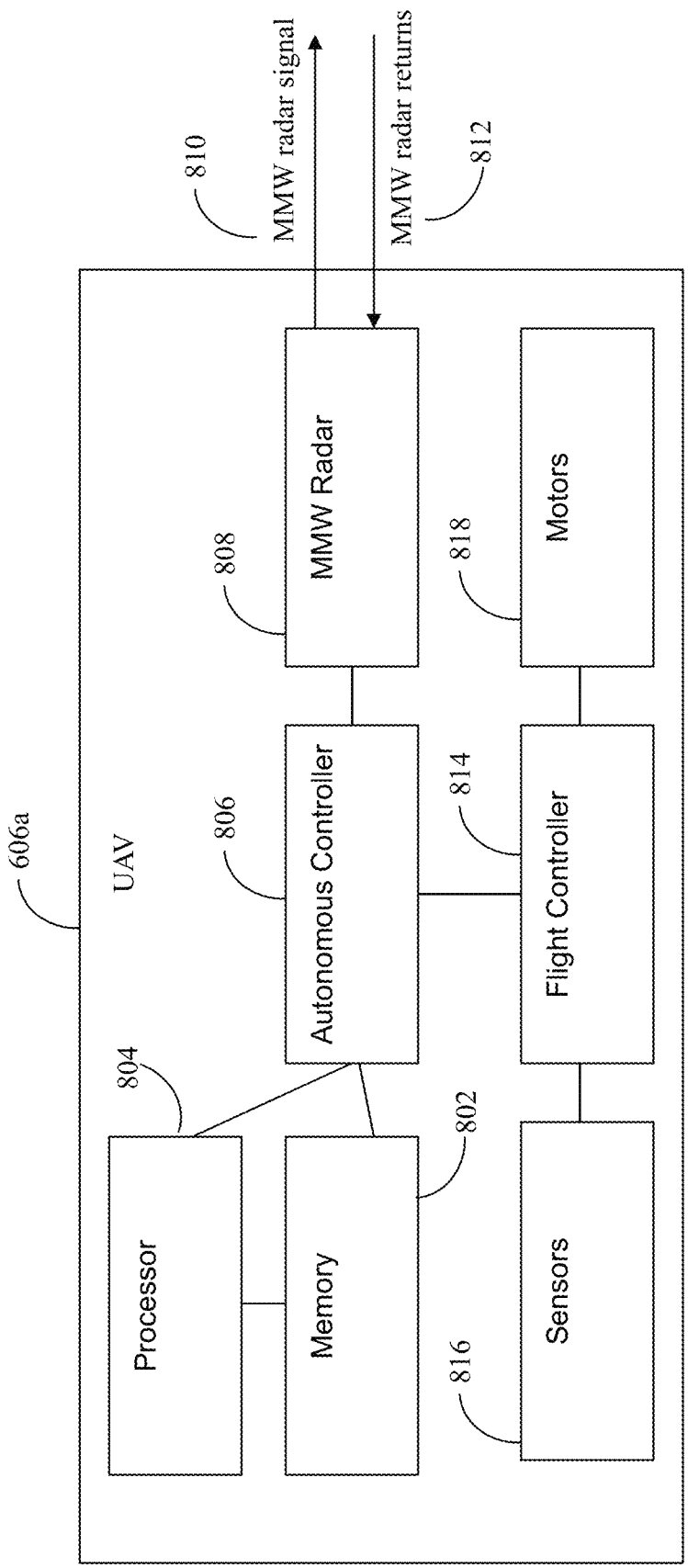
FIG. 8 is a diagram of an exemplary UAV in accordance with an embodiment of the present disclosure.

FIG. 8 is a diagram of an exemplary UAV 606a in accordance with an embodiment of the present disclosure. In an embodiment, UAV 606a includes a processor 804, a memory 802, an autonomous controller 806, a MMW radar 808, a flight controller 814, additional onboard sensors 816, and motors (e.g., to control UAV 606a) 818. In an embodiment, MMW radar 808 is configured to generate MMW radar signals 810 and to receive MMW radar returns 812 corresponding to the sent MMW radar signals 810.

In an embodiment, MMW radar module 806 can perform the operations described above with reference to FIGS. 6A-6C and FIG. 7. For example, in an embodiment, autonomous controller 806 can measure the distance r 600 and angle θ 601 between UAV 606a and a detected UAV 606b, classify the MMW radar returns 812, determine whether UAV 606b is a peer, and update the relative position, velocity, and/or bearing of UAV 606a (e.g., by sending control signals to flight controller 814, motors 818, and/or other UAV components necessary to change the relative position, velocity, bearing, etc. of UAV 606a).

While UAV 606a has been described above with the capability to track a single detection, it should be understood that UAV 606a can be used to track multiple detections in accordance with embodiments of the present disclosure. For example, in an embodiment, MMW radar 808 can send MMW radar signals 810, and MMW radar returns 812 can inform autonomous controller 806 of the presence of multiple potential detections. In an embodiment, MMW radar returns 812 can contain information including the position, velocity, and bearing of each detection.

Autonomous controller 806 can classify each of these detections (e.g., as a peer device, a third party device, another object to avoid, etc.) Based on the classification of each detected object, autonomous controller 806 can send information to flight controller 814 to change the relative position, velocity, bearing, etc., of UAV 606a. For example, if autonomous controller 806 detects two peer UAVs and one other non-peer object, autonomous controller 806 can send information to flight controller 814 to change the relative position, velocity, bearing, etc., of UAV 606a so that UAV 606a flies in formation with the two peer UAVs while avoiding the non-peer object.

It should be understood that UAV 606a can include additional components not shown in FIG. 8 (e.g., a power supply such as a battery, an antenna, propellers, etc.) Further, it should be understood that UAV 606a can be implemented using hardware, software and/or a combination of hardware and software in accordance with embodiments of the present disclosure. Components of UAV 606a (e.g., autonomous controller 806) can be implemented using a single device or multiple devices in accordance with embodiments of the present disclosure and can also be implemented using hardware, software and/or a combination of hardware and software.

5. EXEMPLARY EXPERIMENTAL OPERATION

Two operational scenarios are experimentally demonstrated: (1) autonomous detect and track of a UAV and (2) nap-of-the-earth (NOE) flight. The Delphi SRR2 short-range radar was used in this demonstration. FIG. 9 shows a table of characteristics of the Delphi SRR2 short-range radar in accordance with an embodiment of the present disclosure. In this example, the automotive radar, power control board, and Odroid processor integrated with a DJI S1000 UAV. The radar was mounted with the horizontal field of view oriented in the vertical direction, allowing the vertical beam to sweep in azimuth by rotating the S1000 as shown below. This allows scanning a swath of space ±75° in elevation and 360° in azimuth. The S1000 rises to 30 m and begins to rotate autonomously once on station.

An operator then maneuvers a DJI Phantom UAV, within 20 m of the S1000. The rotation continues until the radar reports a detection to the autonomy algorithm, which initiates a clockwise/counterclockwise (CW/CCW) sweeping of the Phantom. This sweeping uses a 0.5 s timer that reverses the rotation of the S1000 after the detection is lost. This eliminates the need for waypoints and provides a constant CW/CCW sweep across the Phantom or resumes rotation if the detection is lost completely.

The S1000 tracks the Phantom as it moves along a radial arc around the S1000 using the same autonomy algorithm. The S1000 resumes its search mode if the Phantom moves out of detection range. The figure below shows the encounter between the two UAVs. Even for this short-range radar sensor, detection occurs before the intruding Phantom UAV is visible on the S1000 onboard camera.

6. IMPLICATIONS FOR SWARMING UAV MISSIONS

A profound benefit that a radar system in accordance with an embodiment of the present disclosure can offer a small swarm of UAVs is the ability to quickly and accurately provide the relative location of all team members and do so in all-weather conditions and regardless of ambient lighting. This feature allows direct, onboard measurements to guide the implementation of swarming algorithms that currently require vehicles to share their navigation solutions over an intra-swarm network.

To quantify this improvement, we consider that a GPS and inertial navigation system (INS) solution will converge to roughly 1 m accuracy in good conditions and up to 5 m uncertainty if the constellation is in an unfavorable geometry, known as a geometric dilution of precision (GOOP) chimney. Computing a distance between two vehicles effectively doubles the uncertainty, so with GPS and a swarm-spanning network, 2 to 10 m of error in intra-swarm navigation error can be expected. It is possible to reduce this error using trilateration of intra-swarm distances measured using radio signal time of flight, but the uncertainty is highly dependent on the UAV swarm geometry. In the best case, i.e., SNR greater than 30, favorable geometry, and ample time to iterate to a solution, measurement errors can be reduced to a range between 0.5 and 1 m using non-cooperative signals.

Embodiments of the present disclosure have the potential to revolutionize small UAV operations by enabling direct measurement of the position, velocity, and bearing of peers, other UAVs, and obstacles regardless of weather.

7. EXEMPLARY ADVANTAGES

Embodiments of the present disclosure provide several advantages compared to conventional approaches. For example, MMW radars in accordance with embodiments of the present disclosure can generate narrow beam widths on the order of 2° in a form factor of only 5 in.×5 in. Chip-level integration minimizes the size of the supporting electronics to one or two circuit boards of the same size. CMOS integration can reduce this to just one circuit board.

Current MMW automotive radars typically weigh much less than 1 pound. CMOS integration of embodiments of the present disclosure can significantly reduce this weight, and in a custom UAV application, we can reduce weight even further by shifting digital processing requirements to a central processor.

MMW automotive radars typically dissipate less than 10 W. Power dissipation, however, is not a paramount concern in the automotive application. A UAV application in accordance with embodiments of the present disclosure can improve on this, especially by targeting economy in the digital processing.

MMW radars in accordance with embodiments of the present disclosure can provide advanced sensing and imaging functions to small-size UAVs in support of autonomy—but at a low cost. Mass-market MMW automotive sensors are based on a highly cost-optimized architecture that reputedly costs less than $100 per unit in production. Costs can be further reduced as CMOS integration drives the RF transceiver, digital processor, and power conditioning onto a single chip.

Technical analysis and experimental results of embodiments of the present disclosure show the potential for MMW sensing to provide altimetry, terminal guidance, and sense-and-avoid functions for small UAVs. Other potential applications include swarm and formation control. Unlike conventional optical cameras, MMW sensing is robust to inclement weather, fog, and nighttime conditions; MMW sensors directly measure a detection's radial distance and Doppler/velocity in addition to relative position in angular space.

8. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An unmanned aerial vehicle (UAV), comprising:
a millimeter-wave (MMW) radar configured to send a MMW radar signal and to receive corresponding MMW radar returns; and
an autonomous controller configured to:
determine, based on the MMW radar returns, a distance between the UAV and a detected object,
determine, based on the MMW radar returns, an angle between the UAV and the detected object, and
instruct, based on the distance and the angle, the UAV to maintain a predetermined distance between the UAV and the detected object.

2. The UAV of claim 1, wherein the autonomous controller is further configured to:
instruct, based on the distance and the angle, the UAV to fly in formation with the detected object.

3. The UAV of claim 1, wherein the autonomous controller is further configured to:
instruct, based on the distance and the angle, the UAV to avoid the detected object.

4. The UAV of claim 1, further comprising a flight controller, wherein the autonomous controller is further configured to instruct the flight controller to cause, based on the distance and the angle, the UAV to fly in formation with the detected object.

5. The UAV of claim 1, wherein the autonomous controller is further configured to:
start a timer after determining, based on the MMW radar returns, that the detected object has been detected.

6. The UAV of claim 5, wherein the autonomous controller is further configured to:
instruct the MMW radar to send a second MMW radar signal in response to a determination that the timer has expired.

7. The UAV of claim 6, wherein the autonomous controller is further configured to:
instruct the MMW radar to reverse a rotation direction of the second MMW radar signal in response to the determination that the timer has expired.

8. The UAV of claim 1, wherein the MMW radar is configured to send the MMW radar signal using a vertical fan beam.

9. The UAV of claim 1, wherein the MMW radar is configured to send the MMW radar signal using a horizontal fan beam.

10. The UAV of claim 1, wherein the autonomous controller is further configured to:
  instruct the UAV to move to a location with a high probability of detecting a second object;
  determine, based on the MMW radar returns, that the second object has been detected;
  determine, in response to the determination that the second object has been detected and based on the MMW radar returns, a second angle between the UAV and the second object; and
  instruct the UAV to move to decrease the second angle between the UAV and the second object.

11. The UAV of claim 10, wherein the autonomous controller is further configured to:
  determine, in response to the determination that the second object has been detected and based on the MMW radar returns, a second distance between the UAV and the second object;
  determine whether the second angle is less than a predetermined angle; and
  instruct, in response to a determination that the second angle is less than the predetermined angle, the UAV to move to decrease the second distance between the UAV and the second object.

12. The UAV of claim 11, wherein the predetermined angle is 10 degrees.

13. A method, comprising:
  sending, using a millimeter-wave (MMW) radar of an unmanned aerial vehicle (UAV), a MMW radar signal;
  receiving, using the MMW radar, MMW radar returns corresponding to the MMW radar signal;
  determining, based on the MMW radar returns, a distance between the UAV and a detected object;
  determining, based on the MMW radar returns, an angle between the UAV and the detected object; and
  instructing, based on the distance and the angle, the UAV to maintain a predetermined distance between the UAV and the detected object.

14. The method of claim 13, further comprising:
  instructing, based on the distance and the angle, the UAV to fly in formation with the detected object.

15. The method of claim 13, further comprising:
  instructing, based on the distance and the angle, the UAV to avoid the detected object.

16. The method of claim 13, further comprising:
  instructing a flight controller of the UAV to cause, based on the distance and the angle, the UAV to maintain the predetermined distance between the UAV and the detected object.

17. An unmanned aerial vehicle (UAV), comprising:
  a millimeter-wave (MMW) radar configured to send a MMW radar signal and to receive corresponding MMW radar returns; and
  an autonomous controller configured to:
    determine, based on the MMW radar returns, a plurality of distances between the UAV and a plurality of detected objects,
    determine, based on the MMW radar returns, a plurality of angles between the UAV and the plurality of detected objects, and
    instruct, based on the distance and the angle, the UAV to maintain a predetermined distance between the UAV and each detected object in the plurality of detected objects.

18. The UAV of claim 17, wherein the autonomous controller is further configured to:
  instruct, based on the distance and the angle, the UAV to fly in formation with each detected object in the plurality of detected objects.

19. The UAV of claim 17, wherein the autonomous controller is further configured to:
  instruct, based on the distance and the angle, the UAV to avoid each detected object in the plurality of detected objects.

20. The UAV of claim 17, further comprising a flight controller, wherein the autonomous controller is further configured to instruct the flight controller to cause, based on the distance and the angle, the UAV to maintain the predetermined distance between the UAV and each detected object in the plurality of detected objects.

* * * * *